Patented Oct. 10, 1950

2,525,643

UNITED STATES PATENT OFFICE 2,525,643

VINYLIDENE CHLORIDE AND VINYL CHLORIDE POLYMER COMPOSITIONS OF IMPROVED HEAT STABILITY

Edgar C. Britton and Walter J. Le Fevre, Midland, Mich., assignors to The Dow Chemical Company, Midland, Mich., a corporation of Delaware No Drawing. Application August 2, 1948, Serial No. 42,142

5 Claims. (Cl. 260—45.85)

This invention relates to compositions of matter comprising a polymer containing at least 10 per cent of vinylidene chloride or of vinyl chloride, and an agent capable of stabilizing the polymeric body against thermal decomposition.

It is known that the polymer of vinylidene chloride and that of vinyl chloride, as well as copolymers of these materials with one another or with other polymerizable compounds wherein there is a significant amount (at least 10 per cent) of one of the named chlorides, undergo decomposition and darkening under prolonged exposure to heat. The effect is more pronounced at temperatures above the fusion point of the polymer than below such temperature, and the extent of decomposition and darkening is greater after prolonged heating than after brief thermal exposure. Various agents have been proposed for addition to such polymers to reduce the effects of exposure to heat. Some of the suggested compounds, such as the aryl-substituted alkylene oxides, have distinctive and not pleasant odors, and many of them are toxic to humans. Various inorganic salts of the acids of phosphorus have been proposed as heat stabilizers for the mentioned polymers, and some of them have been found to be very effective, but they have the disadvantage of being insoluble in the polymeric bodies and form cloudy or even opaque compositions therewith. It is preferable that the stabilizer employed be non-toxic, exhibit no odor in the stabilized compositions, and form compositions with the polymer which can be molded or extruded to form thin articles which are clear and transparent rather than opaque or cloudy and merely translucent.

It is the object of the present invention to provide a composition comprising one of the previously defined polymeric bodies and a stabilizing agent which will permit the formation of clear and transparent molded or extruded articles of thin section. It is a related object to provide such a composition in which the stabilizer is essentially odorless and non-toxic.

We have now found that the desired results are obtained with the polymer of vinylidene chloride, or the polymer of vinyl chloride, or copolymers wherein either of these compounds is present to the extent of at least 10 per cent, when such polymer is mixed intimately with from 0.5 to 5 per cent of its weight of α-amino-α-toluic acid (α-amino-α-phenylacetic acid). The commonly available dl- or racemic form of the compound is preferred, though either the dextro-rotatory or the levo-rotatory isomer, obtained by resolution of the synthetic product, may be used. For the purpose of protecting the polymeric body against that amount of thermal exposure normally encountered in compression or injection molding or extrusion operations, an amount of about 2 per cent of the stabilizer, based on the weight of the polymer, is found to be sufficient. The stabilizer contributes no odor to its plastic compositions, and no evidence of toxicity of such compositions has been found.

For purposes of comparison with other agents, a series of thermal exposure tests was employed, with small samples of each test composition being compression molded at 150° C. One specimen of each composition was released from the mold within about 1 minute, another was held in the mold at 150° C. for 10 minutes in some cases, and in all cases a sample was so-treated for 15 minutes. The latter two treatments are more extreme than any conditions encountered in thermal processing of most polymeric articles. The color of the resulting molded specimens was noted. The various gradations of color intensity are rated on an arbitrary scale from 1 to 10, with the numeral 1 representing samples apparently unaffected by the thermal treatment, the number 5 representing a definite tan coloration, and the number 10 representing a very dark brown or black color in the molded piece. The symbol A is used to designate clear and transparent moldings (about 0.02 inch thick), the letter B designates cloudy or merely translucent specimens, and C indicates completely opaque products. The results of such a series of tests on a copolymer made from a monomeric mixture of 85 per cent vinylidene chloride and 15 per cent vinyl chloride are given in the following table. For comparison and contrast with α-amino-α-toluic acid, the results obtained with various other α-amino acids are given in the table. There are given as well the results when using tetrasodium pyrophosphate, one of the better inorganic stabilizers.

*Table*

| Modifier | | Rating when molded at 150° C. for— | | |
|---|---|---|---|---|
| Kind | Per Cent | 1 minute | 10 minutes | 15 minutes |
| None | 0 | 3-B | 8-C | 8-C |
| dl-α-amino-α-toluic acid | 2 | 1-A | 4-B | 5-B |
| dl-alanine | 2 | 2-B | 8-B | 8-B |
| isoleucine | 2 | 4-B | | 9-C |
| dl-tryptophane | 2 | 4-C | | 10-C |
| dl-valine | 2 | 3-B | | 8-C |
| α-aminobutyric acid | 2 | 3-B | | 8-C |
| leucine | 2 | 2-B | | 8-B |
| tetrasodium pyrophosphate | 2 | 2-B | 6-C | 6-C |

In the foregoing and other tests carried out with polymers containing significant amounts (at least 10 per cent) of either vinylidene chloride or vinyl chloride, or both, α-amino-α-toluic acid was superior in each case to equal weights (from 0.5 to 5 per cent) of other amino acids in the amount of protection afforded to the polymer against thermal decomposition. It was also found to give better protection to the polymers than does tetrasodium pyrophosphate, without contributing the cloudiness or opacity found when the phosphate is used.

The beneficial effect of α-amino-α-toluic acid on the named polymers is not limited to compositions consisting solely of the polymer and stabilizer, but is found as well in any of the usual plasticized compositions containing such polymers.

The manner in which the stabilizer is introduced into the polymer forms no part of the present invention. Any of several known blending methods may be used, so long as the stabilizer thereby becomes reasonably uniformly distributed through the polymer.

We claim:

1. A plastic composition comprising a uniform mixture of a polymeric material containing at least 10 per cent of a compound from the class consisting of vinylidene chloride and vinyl chloride polymerized therein, and, as a heat stabilizing agent therefor, from 0.5 to 5 per cent, based on the weight of polymer, of α-amino-α-toluic acid.

2. A plastic composition comprising a uniform mixture of a polymeric material containing at least 10 per cent of a compound from the class consisting of vinylidene chloride and vinyl chloride polymerized therein, and, as a heat stabilizing agent therefor, about 2 per cent, based on the weight of polymer, of α-amino-α-toluic acid.

3. A plastic composition comprising a uniform mixture of a polymeric material containing at least 10 per cent of vinylidene chloride polymerized therein, and, as a heating stabilizing agent therefor, from 0.5 to 5 per cent, based on the weight of polymer, of α-amino-α-toluic acid.

4. A plastic composition comprising a uniform mixture of a polymeric material containing at least 10 per cent of vinylidene chloride polymerized therein, and, as a heating stabilizing agent therefor, about 2 per cent, based on the weight of polymer, of α-amino-α-toluic acid.

5. A plastic composition comprising a uniform mixture of a vinylidene chloride-vinyl chloride copolymer, and, as a heat stabilizing agent therefor, from 0.5 to 5 per cent, based on the weight of polymer, of α-amino-α-toluic acid.

EDGAR C. BRITTON.
WALTER J. LE FEVRE.

REFERENCES CITED

The following references are of record in the file of this patent:

FOREIGN PATENTS

| Number | Country | Date |
|---|---|---|
| 734,524 | Germany | Apr. 7, 1943 |